United States Patent
Parker

(10) Patent No.: US 9,579,799 B2
(45) Date of Patent: Feb. 28, 2017

(54) ROBOTIC CONTROL SYSTEM USING VIRTUAL REALITY INPUT

(71) Applicant: Coleman P. Parker, Framingham, MA (US)

(72) Inventor: Coleman P. Parker, Framingham, MA (US)

(*) Notice: Subject to any disclaimer, the term of this patent is extended or adjusted under 35 U.S.C. 154(b) by 0 days.

(21) Appl. No.: 14/699,715

(22) Filed: Apr. 29, 2015

(65) Prior Publication Data

US 2015/0314440 A1 Nov. 5, 2015

Related U.S. Application Data

(60) Provisional application No. 61/986,282, filed on Apr. 30, 2014.

(51) Int. Cl.
| | | |
|---|---|---|
| B25J 9/00 | (2006.01) | |
| B25J 9/16 | (2006.01) | |
| B25J 13/08 | (2006.01) | |

(52) U.S. Cl.
CPC ............ *B25J 9/1689* (2013.01); *B25J 9/163* (2013.01); *B25J 9/1612* (2013.01); *B25J 13/08* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 5,617,515 A | * | 4/1997 | MacLaren | B25J 9/1656 414/5 |
| 6,222,465 B1 | * | 4/2001 | Kumar | G06F 3/017 341/20 |

(Continued)

FOREIGN PATENT DOCUMENTS

| | | |
|---|---|---|
| CN | 101920233 A | 12/2010 |
| KR | 1020010076786 | 8/2001 |

(Continued)

OTHER PUBLICATIONS

International Search Report, Aug. 5, 2015, Cole Parker.

*Primary Examiner* — Jonathan L Sample
(74) *Attorney, Agent, or Firm* — Davis, Malm & D'Agostine, P.C.

(57) ABSTRACT

A robotic system and method performs tasks autonomously on real-world objects (RWOs) upon receipt of inputs from a virtual reality environment. A robotic actuator has tools to manipulate the RWOs, and a set of robot-specific instructions for actuating the tools. A first set of rules governs the RWOs, and sensors detect the presence of the RWOs. A virtual reality (VR) computer uses sensor data to generate a virtual world (VW) including virtual world objects (VWOs) representative of RWOs. A second set of rules governs the VWOs. A user manipulates the VWOs to generate a modified virtual world (MVW). A transformation engine captures differences between the VW and MVW, transforms the differences into inputs for the robotic actuator. An autonomous instruction engine receives the inputs to identify RWOs and combines the inputs with the first set of rules to generate combined instructions usable by the robotic actuator to manipulate RWOs autonomously.

18 Claims, 6 Drawing Sheets

(52) U.S. Cl.
CPC .............. *G05B 2219/39543* (2013.01); *G05B 2219/40053* (2013.01); *G05B 2219/40131* (2013.01)

(56) References Cited

U.S. PATENT DOCUMENTS

| | | | |
|---|---|---|---|
| 6,560,511 B1* | 5/2003 | Yokoo | A63H 11/00 318/568.11 |
| 7,050,955 B1* | 5/2006 | Carmel | G06T 19/00 345/418 |
| 7,336,814 B2 | 2/2008 | Boca et al. | |
| 7,802,193 B1* | 9/2010 | McDonald | B25J 9/1689 715/757 |
| 7,818,091 B2 | 10/2010 | Kazi et al. | |
| 7,925,381 B2* | 4/2011 | Murray, IV | B25J 9/161 700/245 |
| 8,095,237 B2* | 1/2012 | Habibi | B25J 9/1692 29/702 |
| 8,201,692 B2* | 6/2012 | Valerio | B03B 5/44 209/12.1 |
| 8,368,641 B2* | 2/2013 | Tremblay | G06F 3/011 345/156 |
| 8,398,541 B2* | 3/2013 | DiMaio | A61B 19/2203 348/211.3 |
| 8,559,699 B2* | 10/2013 | Boca | B25J 9/1679 382/153 |
| 8,831,780 B2* | 9/2014 | Zelivinski | H04N 21/6175 700/257 |
| 2001/0002098 A1* | 5/2001 | Haanpaa | B25J 9/1689 318/568.11 |
| 2002/0188678 A1* | 12/2002 | Edecker | H04L 29/12066 709/204 |
| 2003/0222977 A1* | 12/2003 | Yoshino | H04N 13/0495 348/51 |
| 2004/0267320 A1* | 12/2004 | Taylor | A61F 2/72 607/2 |
| 2006/0111811 A1* | 5/2006 | Okamoto | B25J 5/007 700/214 |
| 2006/0223637 A1 | 10/2006 | Rosenberg et al. | |
| 2010/0125799 A1* | 5/2010 | Roberts | G06F 3/011 715/757 |
| 2012/0142415 A1* | 6/2012 | Lindsay | H04N 5/2224 463/33 |
| 2013/0038601 A1* | 2/2013 | Han | G06T 13/40 345/419 |
| 2013/0169626 A1* | 7/2013 | Balan | G06T 19/006 345/419 |
| 2013/0245824 A1* | 9/2013 | Barajas | B25J 9/1664 700/253 |
| 2014/0168073 A1* | 6/2014 | Chizeck | G06F 3/016 345/156 |
| 2014/0320629 A1* | 10/2014 | Chizeck | G06F 3/016 348/81 |
| 2015/0314440 A1* | 11/2015 | Parker | B25J 9/1612 700/253 |

FOREIGN PATENT DOCUMENTS

| | | |
|---|---|---|
| KR | 101478908 B1 | 12/2014 |
| WO | WO2013-176762 A1 | 11/2013 |

* cited by examiner

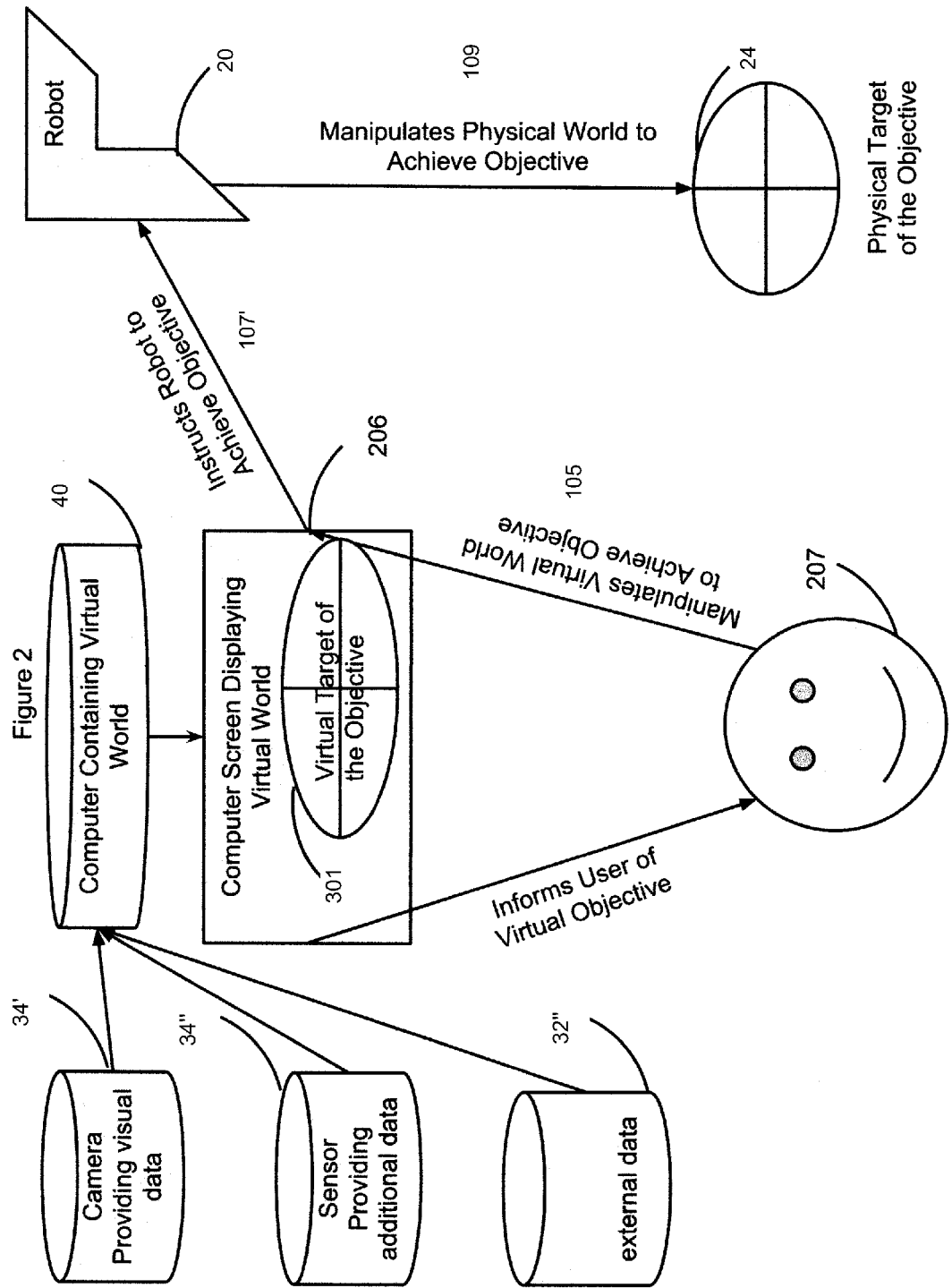

ROBOTIC CONTROL SYSTEM USING VIRTUAL REALITY INPUT

RELATED APPLICATION

This application claims the benefit of U.S. Provisional Patent Application Ser. No. 61/986,282, entitled A System to Allow Manipulation in a Constructed Virtual/Game World to Result in Changes to the Physical World, filed on Apr. 30, 2014, the contents of which are incorporated herein by reference in their entirety for all purposes.

BACKGROUND

Technical Field

This invention relates to robotic control, and more particularly to a system and method for permitting human manipulation of virtual objects in a randomly varying environment to generate inputs by which a robot interacts with corresponding real world objects autonomously.

Background Information

Throughout this application, various publications, patents and published patent applications are referred to by an identifying citation. The disclosures of the publications, patents and published patent applications referenced in this application are hereby incorporated by reference into the present disclosure.

The field of robotic control includes two distinct classes of control: automated or artificial intelligence control; and remote or distance control. Artificial intelligence (AI), or automated control, relies on a set of preprogrammed responses to stimuli. The robot processes inputs to determine which if any of the pre-programmed responses apply. The system is limited to the quality of the input sources, the degree of pre-programmed responses and variation from the "example material" provided at programming time, and the actual material interacted with by the robot. This AI robotic control tends to be good at doing repetitive tasks, where the robot is configured to do the same thing over and over again. An example of this would be an assembly line, where the robot arm picks up a part and places it in a specific location on a circuit board repeatedly. Robotic devices can also learn to operate in an environment, e.g., by learning how to maneuver around its confines. The ROOMBA® vacuum is an example of such a device. These AI robotic control systems tend to be poor at adapting to uncertain, unfamiliar or changing environments. These control systems generally require prehandling of potential environmental inputs, and failure modes when an input is encountered that was not prepared for can range from ignoring that input to shutting down.

Remote or distance control uses a robotic control system that is physically remote from the robot. A human operator selects inputs to the control system and the robot reacts directly to those inputs, generally in real time. Examples include drone airplanes, underwater remote submersibles, and bomb interacting robots. These robots either fully rely on the human controller to perform control actions or revert to a simple autonomous control in the face of lost input, for example flying in a circle in the case of a drone airplane.

Virtual reality, virtual presentation and virtual worlds may provide representations of the real world, or a simulated world for users to view or interact with. For example, a virtual world may be created which represents real world spaces and attributes, through which a user may navigate.

Robotic control systems may use aspects of virtual reality, such as by overlaying computer generated or computer enhanced graphics onto images of real-world objects to aid in remotely manipulating the real-world objects. For example, a graphical user interface (GUI) may be laid over live images to fuse graphical objects with the physical objects. The resulting augmented objects may be displayed and then manipulated by the user using robotic controls. However, this approach still relies on a human operator to directly control the robot, e.g., in real time.

A need exists for an improved robotic control system that overcomes drawbacks of conventional approaches.

SUMMARY

According to an aspect of the invention, a robotic system is provided for performing tasks autonomously on real-world objects (RWOs) upon receipt of inputs from a virtual reality environment. The system includes a processor-controlled robotic actuator having tools configured to manipulate real-world objects (RWOs), including a set of robot-specific instructions executable by the processor for actuating the tools. A data store includes a first set of rules governing the RWOs, while one or more sensors detects the presence of the RWOs. A virtual reality (VR) computer communicably coupled to the robotic actuator and to the sensors captures and uses sensor data to generate a virtual world (VW) including virtual world objects (VWOs) representative of the RWOs. A data store includes a second set of rules governing the VWOs. The VR computer user interface permits a user to interact with the VW in accordance with the second set of rules, to manipulate the VWOs to generate a modified virtual world (MVW). A transformation engine captures differences between the VW and the MVW, transforms the differences into inputs usable by the robotic actuator, and transmits the inputs to the robotic actuator. An autonomous instruction engine receives the inputs to identify RWOs of interest and combines the inputs with the first set of rules to generate a set of combined instructions usable by the robotic actuator to selectively execute individual ones of the robot-specific instructions to interact with the particular ones of the RWOs autonomously.

Another aspect of the invention includes a method for performing tasks autonomously on real-world objects (RWOs) upon receipt of inputs from a virtual reality environment using the foregoing system. The method includes detecting, with the sensors, presence of the RWOs and generating corresponding data. The VR computer then captures and uses the data to generate the VW including VWOs representative of the RWOs. A user, via the user interface, manipulates the VWOs to generate a modified virtual world (MVW). The transformation engine captures differences between the VW and the MVW, transforms the differences into inputs usable by the robotic actuator, and transmits the inputs from the transformation engine to the robotic actuator. The autonomous instruction engine receives and uses the inputs to identify RWOs of interest and combines the inputs with the first set of rules to generate a set of combined instructions usable by the robotic actuator to selectively execute individual ones of the robot-specific instructions to interact with the particular ones of the RWOs autonomously. The robotic actuator then manipulates the RWOs.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 2 is a functional block diagram of aspects of the embodiment of FIGS. 1A-1B;

DETAILED DESCRIPTION

Figure 1A:
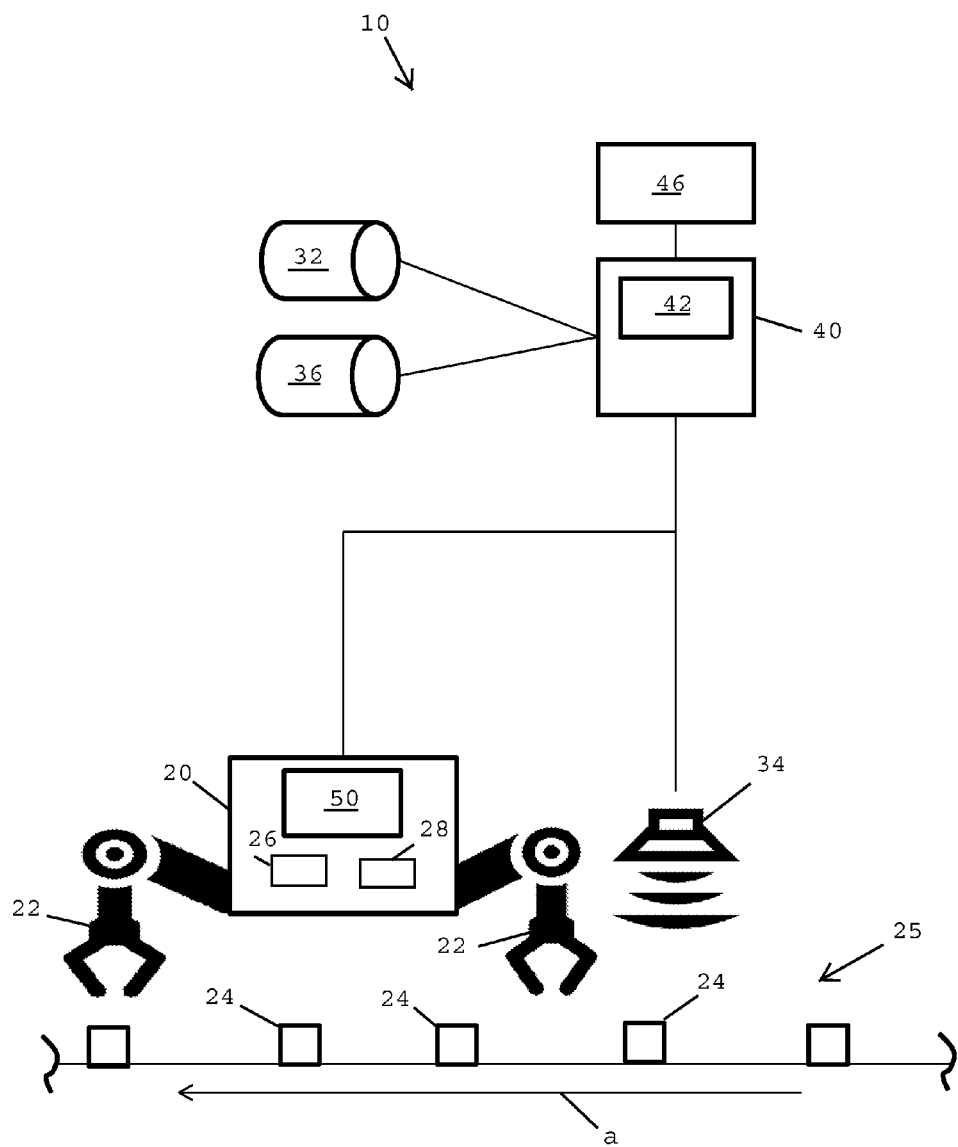
FIG. 1A is a schematic diagram of an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. For example, reference to "an analyzer" includes a plurality of such analyzers. In another example, reference to "an analysis" includes a plurality of such analyses.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

General Overview

The present inventors have recognized that robots need massive amounts of telemetry data to operate effectively in many real-world applications, and that current approaches to collecting this telemetry are too inefficient to be practical. They realized that collecting telemetry data through data entry is not something humans excel at, as they tend to bore easily and their engagement, productivity and quality all decline rapidly. The inventors recognized that a game that users can "fail" at, and that collects telemetry data when the users succeed, could efficiently provide the large amounts of data required for many robotic applications such as, for example allowing robots to sort valuables or hazards out of trash (municipal solid waste, "MSW").

Conventional robots cannot effectively sort trash. Computer vision can't handle it because the process is too complex, making attempts at automation too slow, with too much machine learning required. The inventors have recognized that humans and robots could efficiently sort recyclables out of MSW if the human were supplying relevant data to the system while playing a game. The human players would be identifying and classifying items and the robots would be picking. Objectives of an exemplary game may include: find the most valuable items, find items within the time allotted, find harmful items, classify different types of the same item, identify the orientation and location of an item, etc. The inventors' research has indicated that a system with a goal of 20% identification and removal would have a 3-year ROI of 30%. Individual players with better performance would translate directly into better compensation, and harder challenges.

Such a solution may succeed, while other approaches have failed, for the following reasons. Humans enjoy games, excel at and are captivated by them. Prior "gamification" solutions have attempted to enable data collection by "gamifying" a data-collection interface. However users' interest in "gamified" products fades quickly unless the product provides a useful benefit beyond the "gamified" aspects. The typical rewards: badges, check-in, status, loose value quickly because they are trivially achieved. Standard data collection systems create a structured way to enter the required data. It is this structure and repetitiveness that lead to disengagement and prevent those systems from collecting enough telemetry data to solve many complex real-world problems.

The present inventors have identified a way to use humans to collect this telemetry data with the enthusiasm and longevity of gaming. The inventive solution makes the system a game, does not have a fixed solution or a fixed outcome, presents a challenge and lets the player find the solution. A player needs to be able to try and fail and try again to succeed. The solution effectively carves a problem up into challenging pieces where there isn't a fixed solution. Some examples might be: identify as many particular objects as possible in the time allowed, sort these objects in under a minute, etc. The solution thus breaks the ultimate objective of winning the game, into real tangible small objectives, engaging a try, fail, try again, approach to enable players to solve real problems and be truly engaged. The inventive embodiments will rely on the users' ability to solve the posed problems. These embodiments will let the users figure out how to solve the problems, and will then collect data based on the users' solutions.

The inventive embodiments may be used in any number of applications involving manipulation of objects in a dynamic or otherwise randomly varying environments. In addition to trash sorting, other potential applications include robotic mining, construction, deep sea drilling, or others with problems whose solutions cannot be efficiently mapped to a decision tree, but which may be solved by a robot who was presented with set of actions provided by the results of users playing a game.

Briefly summarized, particular embodiments of the present invention include a system that allows for the control of robots where a human interacts with virtual representations of real world objects and the robots interact with said objects in the physical world autonomously and asynchronously. These embodiments address limitations of conventional approaches by permitting human operator(s) to select actions, resolve conflicts or otherwise determine a course of desired outcomes. The system will translate the actions and outcomes into a set of instructions for the robot. The robot will then effect the changes in the real world as dictated by the changes to the virtual/constructed environment.

Terminology

Where used in this disclosure, the term "virtual reality" is used consistently with its conventional definition of an artificial world that consists of images and sounds created by a computer and that is affected by the actions of a person who is experiencing it. The terms "computer" and "end-user device" are meant to encompass a workstation, personal computer, personal digital assistant (PDA), wireless telephone, or any other suitable computing device including a processor, a computer readable medium upon which computer readable program code (including instructions and/or data) may be disposed, and a user interface. Terms such as "server", "application", "engine" and the like are intended to refer to a computer-related component, including hardware, software, and/or software in execution. For example, an engine may be, but is not limited to being, a process running on a processor, a processor including an object, an executable, a thread of execution, a program, and a computer. Moreover, the various components may be localized on one computer and/or distributed between two or more computers. Terms such as "component" or "module", and the like are intended to refer to a computer-related entity, either hardware, a combination of hardware and software, software, or software in execution. For example, a module may be, but is not limited to being, a process running on a processor, a processor, an object, an executable, a thread of execution, a program, and a computer. By way of illustration, both an application running on a server and the server (or control related devices) can be modules. One or more modules may reside within a process and/or thread of execution and a module may be localized on one computer and/or distributed between two or more computers or control devices. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs. The term "asynchronous" refers to sensing and responding to external events in a manner that is not "real-time".

Programming Languages

The system and method embodying the present invention can be programmed in any suitable language and technology, such as, but not limited to: Assembly Languages, C, C++; Visual Basic; Java; VBScript; Jscript; Node.js; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

As mentioned above, embodiments of the invention include a system and method that enables robots to perform tasks that require software solutions that are non-decision trees, or which cannot be mapped to a decision tree in a cost-effective manner. The robots are enabled to perform these tasks in the real world by receiving a set of inputs generated by humans solving puzzles in a virtual world. The robots effectively use the inputs as guidelines which enable the robots to autonomously select and layer a number of available procedures to accomplish the desired tasks. Turning now to the figures, embodiments of the present invention will be more thoroughly described.

Turning now to FIG. 1A, a generalized embodiment of the inventive robotic system 10 for performing tasks autonomously on real-world objects (RWOs) upon receipt of inputs from a Virtual Reality environment is shown and described. System 10 includes a processor-controlled robotic actuator 20 having tools 22 configured to manipulate real-world objects (RWOs) 24, the robotic actuator including a memory 26 having a set of robot-specific instructions 111 (FIG. 1B) stored thereon, the robotic actuator further including a processor 28 configured for executing the robot-specific instructions 111 for actuating the tools 22. As also shown, system 10 includes a data store 32 including a first set of rules 102 (FIG. 1B) governing the RWOs 24, and one or more sensors 34 configured to detect or otherwise generate data in response to presence of the RWOs 24, e.g., within an industrial process 25 moving the RWOs in downstream direction shown by arrow a. In particular embodiments, the sensor(s) 34 includes an electromagnetic sensor such as an image capture (e.g., CCD) device.

Figure 1B:
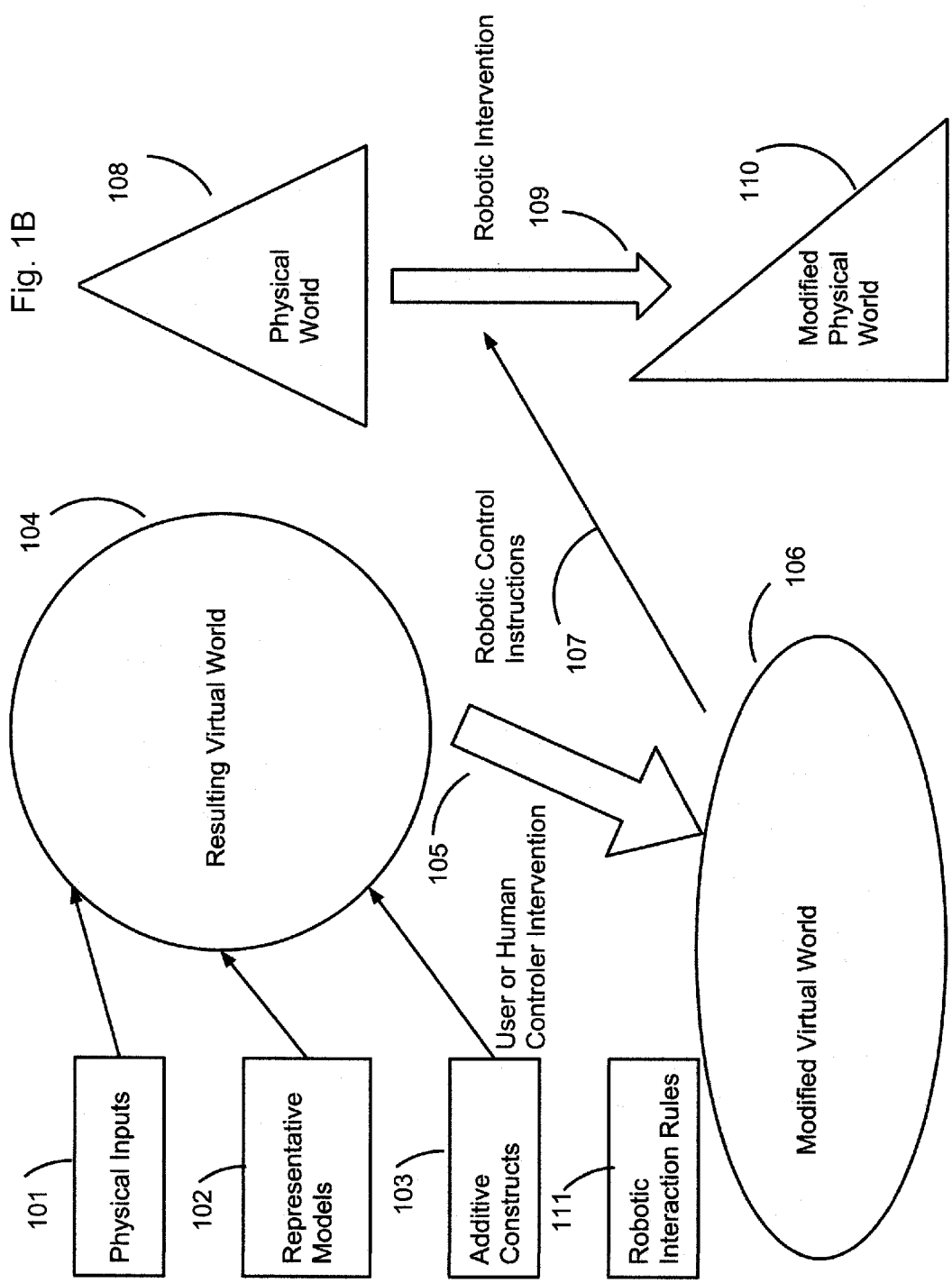
FIG. 1B is a functional block diagram of an embodiment of the present invention in a representative application.
Figure 3:
FIG. 3 is an exemplary display of a portion of a constructed virtual world in accordance with the embodiment of FIGS. 1A-2.

System 10 further includes a Virtual Reality (VR) computer 40 communicably coupled to the robotic actuator 20 and to the one or more sensors 34. The VR computer 40 is configured to capture the data from sensor 34 and to use the data to generate a virtual world (VW) 104 (FIG. 1B) including virtual world objects (VWOs) 301 (FIG. 3) representative of the RWOs 24. A data store 36 includes a second set of rules 103 (FIG. 1B) governing the VWOs 301. The VR computer 40 includes a Graphical User Interface (GUI) module 42 that generates a GUI 44 (FIG. 3). GUI 44 enables a user to interact with the VW in accordance with the second set of rules 103 (in data store 36) to manipulate the VWOs 301 and generate a modified virtual world (MVW) 106 (FIG. 1B). A transformation engine 46 is configured to capture differences between the VW 104 (FIG. 1B) and the MVW 106 (FIG. 1B), and to transform the differences into inputs 107 (FIG. 1B) usable by, and forwarded to, robotic actuator 20. The robotic actuator 20 includes an autonomous instruction engine 50 configured to receive the inputs 107 from the VR computer 40, and to combine the inputs with the first set of rules (of data store 32). This combination enables engine 50 to generate a set of combined instructions usable by the robotic actuator 20 to selectively execute individual ones of the robot-specific instructions 111 in memory 26 to interact with the particular ones of the RWOs 24 autonomously. For example, once the particular RWOs 24 of interest have been identified and that information conveyed to the robotic actuator, the robotic actuator 20 independently selects from any number of approaches how to best accomplish the desired result. Specific examples of these embodiments will be described in greater detail hereinbelow.

For example, in particular embodiments the transformation engine 46 is configured to capture differences between the virtual world (VW) 104 and the modified virtual world (MVW) 106 to identify virtual world objects (VWOs) 301 selected by the user. The engine 46 then transforms the identified VWOs into inputs 107 (FIG. 1B) usable by the robotic actuator. In various embodiments, the autonomous instruction engine 50 receives the inputs in the form of the user identified VWOs, and uses the inputs to identify corresponding RWOs 24. In this regard, the combination of sensor 34 and VR computer 40 may track the location of the RWOs with process 25, based on the position (e.g., two or three-dimensional x, y and z Cartesian coordinates) on a conveyor belt or the like, and the known speed of the conveyor in the downstream direction. Once the locations of the corresponding RWOs are known, in particular embodiments the autonomous instruction engine combines the inputs with the first set of rules in data store 32, to determine the desired end-results of manipulation of the RWOs. In other words, the engine 50 combines the input information (e.g., the location, type, size, etc. of the RWOs) along with the first set of rules (e.g., bins into which the particular RWOs should be placed), to generate a set of combined instructions usable by the robotic actuator. With the combined instructions, the autonomous instruction module 50 then selects from among the various robot-specific instructions 111 (FIG. 1B), such as may be stored in the firmware of the robotic actuator 20, to optimally engage and manipulate the RWOs to effect the desired results. Examples of the robot-specific instructions include the type or size of tool 22 to use, the force with which tool 22 should grasp the particular RWO, the speed at which the tool should be moved in order to intercept the RWO as the process carries the RWO in the downstream direction, etc. The robot 20 may thus interact with the RWOs autonomously by inserting the combined instructions into one or more of a plurality of preprogrammed instruction sets to synchronize the MVW 106 with the desired impacts on the RWOs.

Those skilled in the art will recognize that embodiments of the present invention may be used in any number of applications involving varying or otherwise non-routine parameters. One application in particular involves identifying pulling recyclable or hazardous items from a stream of trash traveling on a conveyor belt, and depositing the items into designated bins. In these embodiments, the first set of rules governing the RWOs may include but are not limited to mathematical laws, physical laws, bio-chemical laws, or other rules pertaining to or governing the interaction of objects. More specific examples include: desired locations/bins for particular RWOs; physical properties of the RWOs, including materials from which the RWOs are constructed; safety considerations associated with handling of the RWOs, including hazards; value of the RWO object, including rules governing the value of the object based on color, material type, quality, soil level; harm induced by the RWO if it were burned, buried, submerged, e.g., in pollute produced in ppm (parts per million); and mixtures and combinations thereof.

In these embodiments, the second set of rules 103 governing the VROs may include, but is not limited to, colorization of objects, sounds and music associated with objects or actions, animations or videos associated with objects or actions in VW 104. More specific examples of rules 103 include: colorization of objects based on value, material type, material grade, relative difficulty in grasping with the robot, rules about ppm of pollutants allowed to be un recovered; rules about the percent (%) of material by type to be recovered to meet different goals; rules about the value of materials recovered and the goal of the value of the recovered materials; sounds and music associated with the appearance of certain objects, such as with the collected objects or of desired objects that were "missed" by the user; sounds associated with certain actions which are being "rewarded" and sounds associated with actions being discouraged, such as an incomplete identification of an object, or failure to identify a predetermined number of objects per minute, as determined by the rules governing the goals; animations or videos associated with new actions for the user to learn, examples of items the user missed in previous sessions, new items of particular value or harm, or significant changes in the value or harm of a previously known item; and mixtures or combinations thereof.

Turning now to FIG. 1B, aspects of additional embodiments of the present invention are shown and described. The VW 104 generated by the various embodiments may be constructed using information sets 101, 102, and 103. Set 101 is a set of general physical inputs to the system, including but not limited to light, visual and non-visual bands, sounds, temperature, weight, relative movement, etc. These inputs 101 are translated into data and representations in the virtual world 104. As discussed above, set 102 includes rules that govern the behavior of the RWOs in the physical world. The physical world is shown schematically at 108, which in particular embodiments, corresponds to process 25 (FIG. 1A). In particular embodiments, these rules 102 may be translated into virtual rules that may be applied to the VWOs within VW 104, e.g., in combination with the rule set 103, which as discussed hereinabove, is a set of rules and/or constructs that exist in the VW 104. As mentioned above, rules 103 are configured to aid the user in manipulating the VROs in VW 104, and may include, but are not limited to, colorization of objects, sounds and music associated with objects or actions, animations or videos associated with objects or actions in VW 104.

Once it has been created, a user 207 (FIG. 2) may interact with VW 104 using GUI 44 (FIG. 3) generated by GUI module 42 of VR computer 40. It should be noted that user 207 may access VR computer 40 directly, and/or remotely via a user device, e.g., in a client-server arrangement. In this regard, computer 40 may provide conventional server functions, with the user device functioning as the client, accessing the server's GUI 44 via a web browser program or the like. For ease of explanation, the embodiments shown and described herein presume the user is physically located at, and is operating the system 10 from, VR computer 40.

In particular embodiments, the constructed VW 104 includes the plurality of objects, sounds, instructions, rules, behaviors, and constructions provided by inputs 101, 102, 103. The user 207 (FIG. 2) then interacts with the VW 104 via GUI 44 (FIG. 3) to generate a set of modifications 105, e.g., in the form of decisions, actions, manipulations, inaction and identification, etc., to generate the MVW 106. It should be understood that the set of modifications or actions available to the user is partially determined by the inputs 101, 102 and 103, while also being determined by the ingenuity and intelligence of the user 207 (FIG. 2). As mentioned above, robotic control instructions 107 are generated by transformation engine 46 (FIG. 1A) based on the difference between the original virtual world, 104, and the modified virtual world, 106, and in particular embodiments, may include the first set of rules 103 governing the RWOs. In various embodiments, the specifics of the instructions 107 are governed by the inputs to the system 103, and optionally 101 and 102, e.g., to limit the available actions to those corresponding to desired manipulation of selected RWOs 24. For example, the inputs 101-103 may restrict instructions 107 to manipulation of RWOs of interest, rather than permitting manipulation of other aspects of the particular process 25.

The set of robotic control instructions 107 is passed to the robot(s) 20, 208 (FIGS. 1A, 2). Then as discussed above, the robot uses autonomous instruction engine 50 to combine or otherwise cross-check the inputs 107 with the first set of rules 102 (which may be incorporated into the instruction set 107 as mentioned above). This combination enables engine 50 to generate a set of combined instructions usable by the robotic actuator 20 to selectively identify and execute individual ones of the robot-specific instructions 111 to interact with, e.g., manipulate, the user-identified/selected RWOs 24 autonomously. This interaction is shown as robotic intervention 109. In this manner, the original physical world or process 108, 25, is modified as desired to produce modified physical world 110.

Turning now to FIG. 2, aspects of the invention are shown and described with respect to an alternate embodiment of the present invention shown as system 200. System 200 is substantially similar to system 10 of FIG. 1, but for the following distinctions. As shown, system 200 includes a sensor 34' in the form of a camera (e.g., CCD device), capable of capturing visible or non-visible light, that provides data to the VR computer 40. One or more cameras of varying types can be deployed, but are represented as a single element on the drawing. One or more additional sensors 34" may also be provided as shown. These additional sensors 34" may include magnetic, temperature, velocity, or substantially any other devices capable of collecting data about physical objects 24 or other aspects of the process/physical world 25, 108. In system 200, a single data store 32' is used to store the various rules, data, or information pertinent to the creation of the virtual world, the manipulation of objects in that world or the value of objects in the physical world, instructions or rules about their use. VR computer 40 creates and maintains the virtual world, as described above. It is noted that computer 40 may include multiple computers, each containing portions of the requisite data storage, data processing, and/or data manipulation as shown and described herein, but is represented as a single entity for simplification. VWO 301 is shown on a user interface 206 that allows the user 207 to see and interact with the virtual world 104, e.g., via GUI 44. Interface 206 may take the form of one or more monitors, projectors, touch screens, etc., including one or more integral or separate input devices, e.g., in the form of touch screen, keyboard, mouse, joystick, etc. All of these components, identified as a group in 206, combine to provide the user 207 with the ability to visualize the VW and manipulate the VW at 105, to send instructions 107 to robot 20. Robot 20 then operates as described hereinabove to effect the interventions 109 to manipulate the RWOs 24.

It is noted that the robot 20 may take the form of a single robot with multiple functions, multiple robots with a single function working in a coordinated manner with one another, and/or any combination thereof to meet the needs of the particular process 25. For ease of explication, these robots 20, their mounting equipment, safety equipment, power sources, and control inputs have been simplified in these figures to a single component 20. It should also be recognized that process 25, including RWOs 24, and/or the desired modifications to the physical world 110, represent the desired outcomes in the physical world, that the user 207 will use the VW displayed at 206 to determine how to achieve particular desired objectives in the VW. The desired objectives in the VW may be to win a game by scoring points. The system then translates the VW objectives into the RW objectives 24, 110, so that the actual real world objectives may not be apparent to the user. It should also be noted that the particular RW objective may be a single objective such as moving an item 24 from one location to another, or a series of complex smaller objectives/movements to achieve an overall objective. The series of small objectives, their prerequisite actions, order of operation and intermediate steps are all represented in the single element 24, 110.

Turning now to FIG. 3, an exemplary display 206 with GUI 44 is shown, including an exemplary VWO 301. In the example, the user virtually manipulates the VWO 301 by moving it to a designated location, e.g., for cans, shown at 302. Although shown as a location, in other embodiments manipulation 302 may take the form of a transformation action such as crush or divide. As also shown, GUI 44 may include a feedback display 303, which in this example provides visual feedback regarding the user's progress in achieving the virtual objective. It should be recognized that the feedback may in addition or in the alternative, include sounds, music, color changes, etc. The feedback may include substantially any piece of information that informs and motivates the user to continue to identify VWOs 301 and achieve objectives 302, which are then used by the system to effect the desired real world objectives 24, 110.

Figure 4:
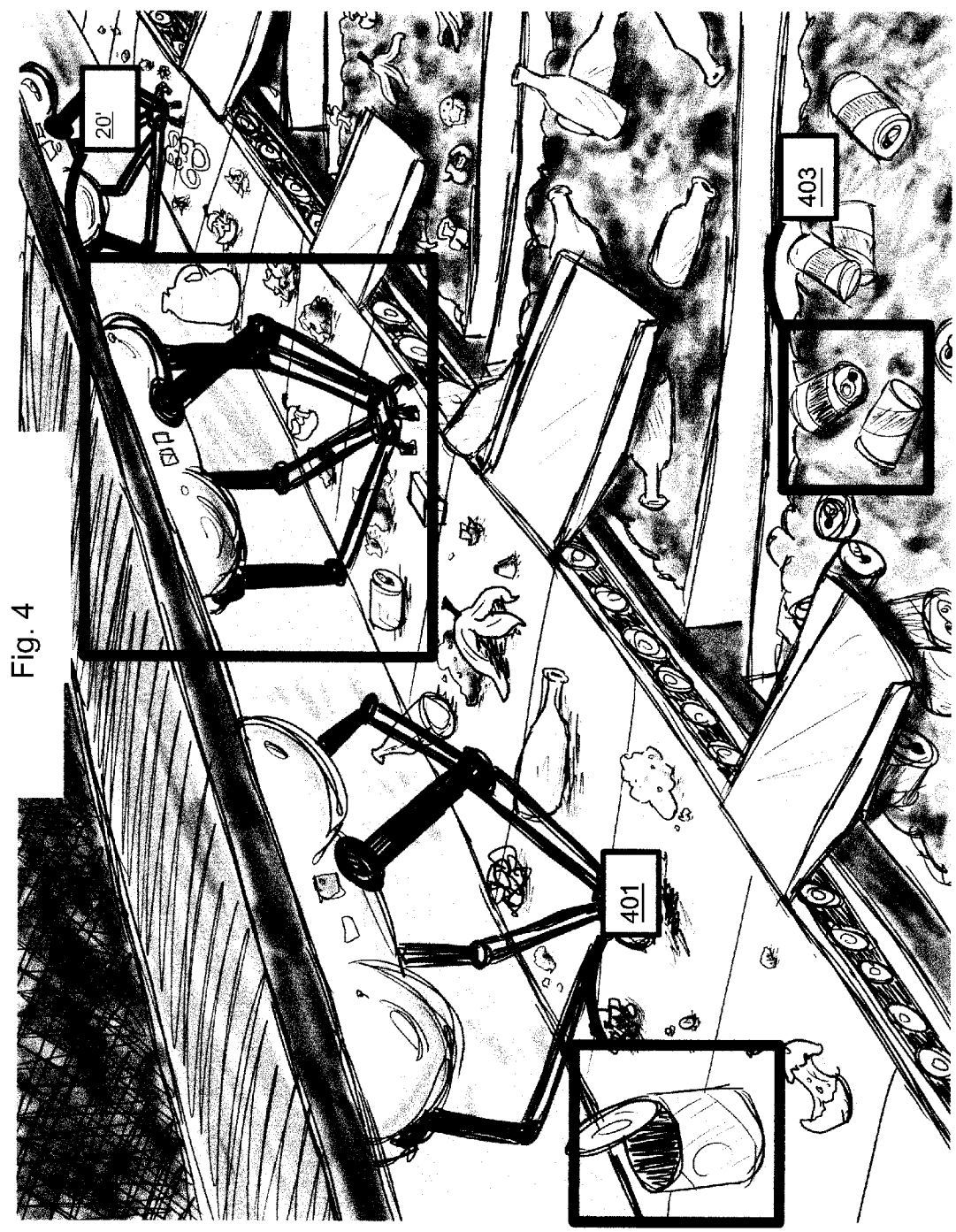
FIG. 4 is a perspective view of the embodiments of FIGS. 1A-3 in a representative application.

Turning now to FIG. 4, in another exemplary embodiment, a series of robots 20' are disposed in operative engagement with a process 25 in the form of trash traveling on a conveyor. The VWO 301 (FIG. 3) corresponds to RWO 401, which is one of many items that make up the superset of physical targets 24 (FIG. 1A). Robots 20' are specialized to perform the task required in the physical world, namely, engaging the RWOs 401 and moving them to appropriate bins 403. The RWOs in location 403 represent the modified physical world 110 (FIG. 1B) after the robotic intervention 109 (FIG. 1B).

The embodiments shown and described herein may be uses in any number of applications, including, as mentioned above, to select recyclable items from a stream of municipal trash. In these applications, trash will be loaded onto a conveyor belt which moves through a recycling plant. It is noted that the VR computer 40 may pre-classify VWOs where it is able, and may also suggest actions to the user. Some of the VWOs, depending on the rules 101, 102, 103, etc., may be highlighted by the system. In other instances the VWOs will be identified by the human operators 207 (FIG. 2). As discussed above, the human operators 207 will indicate the correct identification by modifying the virtual world. Changes in the virtual world will be sent to the robots to they will pick up the identified items and deposit them in the provided locations.

Another application suitable for particular embodiments of the present invention involves the selection of recyclable items from a stream of construction waste. Construction waste will be loaded onto a conveyor belt which moves through a recycling plant. The Virtual world created, will pre-classify items where it is able and suggest actions to the user. Some items depending on the rules of the virtual world will be highlighted by the system. Other items will be identified by the human operators. Human operators will indicate the correct identification by modifying the virtual world. Changes in the virtual world will be sent to the robots which will then pick up the identified items and deposit them in the provided locations.

In another application, embodiments will sort different recyclables from a stream of unsorted recyclables. The users of the virtual world will identify different types of materials, for example plastics of different types, paper, metal, etc.

Yet another potential application is the selection and removal of dangerous or toxic materials from a stream of trash designated for incineration. The system would construct a virtual world to identify the items it would be harmful, wasteful or dangerous to combust. The user of the system would identify those items and indicate the desired course of action to be taken. The robots would receive their instruction from the system based on the difference between the initial virtual world and the one created through manipulations by the users. Robots would pick up and deposit the items, as instructed by the system. The remaining waste would be safely incinerated.

Still another application is the deconstruction of complex materials. The virtual world will be constructed which includes the item or items being dismantled, information about the value of the items, and the best approaches to dismantling it and the dangers in doing so. The user of the virtual world will then select a course of action, e.g., by selecting from a menu of tasks to generate a list of ordered tasks to perform, in conjunction with the user's own expertise. Actions selected by the users in the virtual world will be translated into commands for a series of robots located in the physical space. There robots will perform the tasks selected and report status back into the virtual world to indicate the changes in state.

It should be noted that the embodiments shown and described herein represent more than simply "gamification" as conventionally defined, namely, as "the process of adding games or gamelike elements to something (as a task) so as to encourage participation." (http://www.merriam-webster.com/dictionary/gamification). Rather than simply applying gaming rewards and recognition to non-game tasks, embodiments of the present invention effectively create a "Real World Game" in which the objective is specified but not the approach. The virtual reality provided by the VR computer(s) 40 effectively provides the user with puzzles to be solved, along with various visual and/or auditory features to aid the user in solving the puzzles, and provide for tracking the user's progress, e.g., for adjusting the user's compensation. And, while these embodiments may operate in time-sensitive applications, in which the robot(s) 20 must keep up with processes 25, they need not operate in real-time in the sense of conventional remote or distance control of robots such as drone airplanes or those used to perform telemedicine procedures. Rather, these embodiments enable the use of asynchronous user input, which the robots may use at a later time to autonomously perform the desired real world operations as described. Moreover, although the various robotic actuators 20, 20', shown and described herein include hardware devices with hardware tools 22, it should be recognized that the robotic actuators and/or tools may be implemented in various combinations of hardware and/or software without departing from the scope of the invention.

Figure 5:
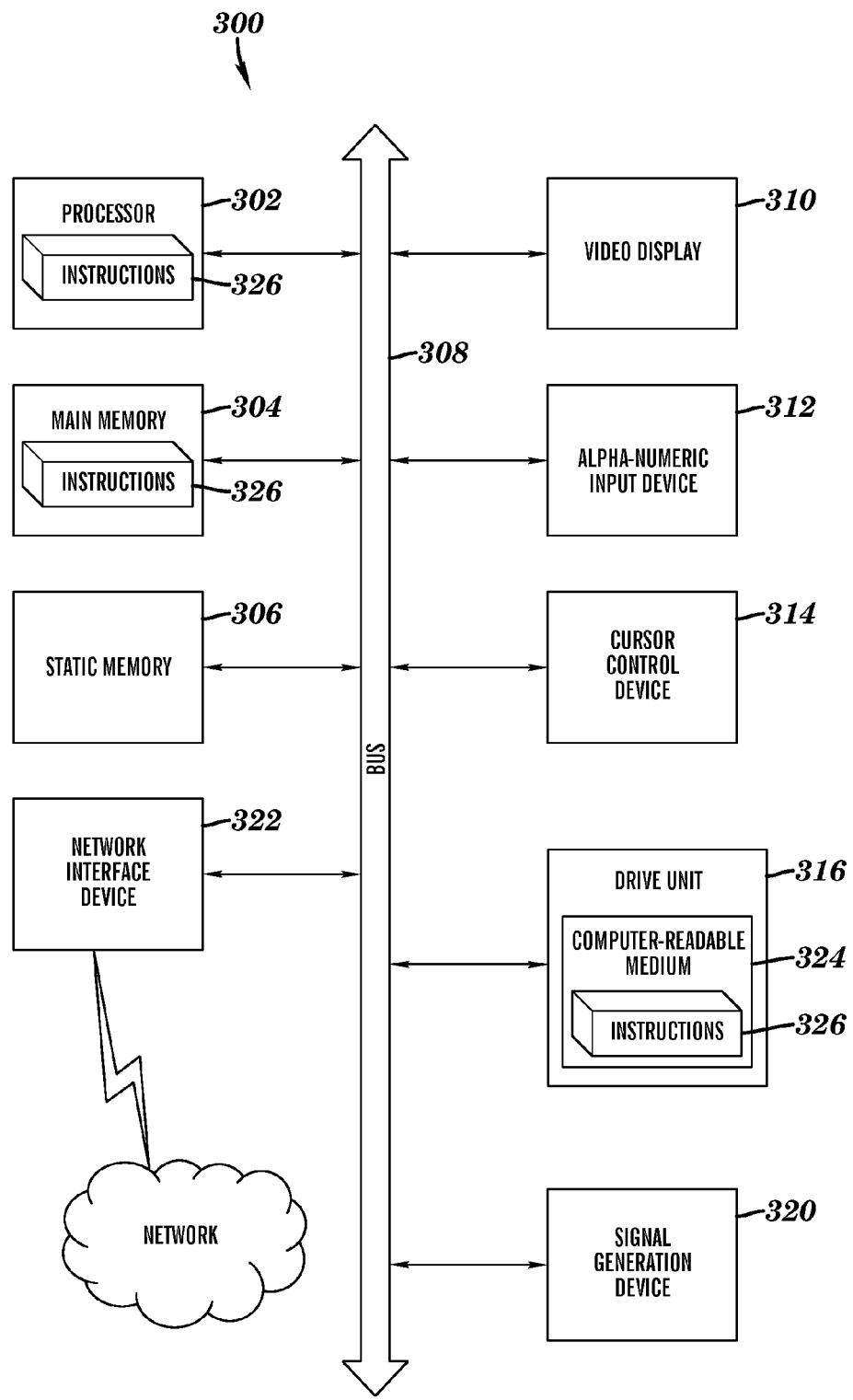
FIG. 5 is a block diagram of one embodiment of a computer system usable with various aspects of the present invention.

FIG. 5 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention.

Furthermore, embodiments of the present invention include a computer program code-based product, which includes a computer readable storage medium having program code stored therein which can be used to instruct a computer to perform any of the functions, methods and/or modules associated with the present invention. The non-transitory computer readable medium includes any of, but not limited to, the following: CD-ROM, DVD, magnetic tape, optical disc, hard drive, floppy disk, ferroelectric memory, flash memory, phase-change memory, ferromagnetic memory, optical storage, charge coupled devices, magnetic or optical cards, smart cards, EEPROM, EPROM, RAM, ROM, DRAM, SRAM, SDRAM, and/or any other appropriate static, dynamic, or volatile memory or data storage devices, but does not include a transitory signal per se.

The following illustrative examples demonstrate certain aspects and embodiments of the present invention, and are not intended to limit the present invention to any one particular embodiment or set of features.

EXAMPLE

A prototype of system, substantially as shown and described with respect to FIGS. 1A-5, was built to find batteries and mercury containing Compact Fluorescent Lamp (CFL) light bulbs in a trash stream about to be burned. A USB video camera visual data source was used as sensor 34. A bright light was also used to provide higher contrast for the camera. The physical inputs 101 included a live video feed generated by the camera. A representative first set of rules 102 for the RWOs (CFLs) 24 were loaded onto data store 32, and included the size of the batteries and CFL bulbs, the best pickup location for a CFL, the best location to pick up a broken piece of glass, and the deposit location for each type of material picked up, in x,y coordinates. This set 102 also included data about the amount of broken CFL glass it was safe to leave, and the priority to use in removing batteries in the event more batteries were identified then could be removed, by ordering them from most to least hazardous. Rules 103 governing the VROs were added, which included: different sized buckets based on relative hazards, with larger buckets corresponding to greater hazards; instructions to the users 207 regarding possibilities for how to solve the problem when presented with small glass, broken CFLs, or too many items on the screen at one time; and goals for the user including removing as much as possible, and removing the most hazardous materials first. Other rules 103 included application of a high contrast filter to the video feed to make it easier to identify the objects; addition of sounds to the selection and the deposit of an item into a bucket; calming background music to keep the user calm and focused; bright colors used in the GUI 44 to help keep the user alert; a visual counter to track successful selections and to indicate the target pace needed to be achieved. The set of robotic interaction rules 111 included identification of which tool 22 (e.g., gripper) the robot should use to pick up which type of item, e.g., CFL bulb, battery, or CFL glass, and how much to close the gripper to successfully pick up different sized batteries.

The VR world/game 104 was constructed using Adobe® flash and resided on a Windows™ 8.1 tablet 40, with a touchscreen serving as the display 206 of the virtual world. While interacting with the virtual world 104, the system generated, in real-time, a modified virtual world 106. The user's interactions 105 were sent from the computer 40 containing the virtual world to another computer 40 in the form of a .net web server running on the azure platform. This was done to allow the player to be located remotely from the robot 20 and the physical world 108, by using the Internet as a communications protocol. The web server recorded these modifications to form the MVW 106, and used them to generate instructions 107, which were sent to the robot, in the form of, "pick up an item of "item_type", at location, x,y". An example of these instructions, was, "aa-battery" "23,43,". The robot 20 received these instructions from a socket connection from the Azure web server.

The robot 20 was a virtual robot simulator, created by the ABB company, called Robotic Studio, which simulated the performance of one of its many robots including the IRB 1600. The robot used the information from the representative models 102, including the bin to put the items in and the grip target point for the item identified, and provided the robotic interactions 111. With this information the robot automatically and autonomously manipulated simulated RWOs in the physical world 108 to create the modified physical world 110 through robotic intervention 109. The robotic intervention 109 took the form of the robot 20 moving to the point provided by the instructions 107, using the gripper indicated by the robotic rules 111, and picking up the physical target 24 at the specified location.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

It should be further understood that any of the features described with respect to one of the embodiments described herein may be similarly applied to any of the other embodiments described herein without departing from the scope of the present invention.

Having thus described the invention, what is claimed is:

1. A robotic system for performing tasks autonomously on real-world objects (RWOs) upon receipt of inputs from a virtual reality environment, the system comprising:
   a processor-controlled robotic actuator having tools configured to manipulate real-world objects (RWOs), the robotic actuator including a memory having a set of robot-specific instructions stored thereon, the robotic actuator further including a processor configured for executing the robot-specific instructions for actuating the tools;
   one or more data stores including a first set of rules governing the RWOs;
   one or more sensors configured to detect presence of the RWOs and to generate data corresponding to said presence;
   a virtual reality (VR) computer communicably coupled to the robotic actuator and to the one or more sensors, the VR computer configured to capture the data and to use the data to generate a virtual world (VW) including virtual world objects (VWOs) representative of the RWOs;
   the one or more data stores including a second set of rules governing the VWOs;
   the VR computer including a user interface permitting a user to interact with the VW in accordance with the second set of rules, to manipulate the VWOs to achieve desired VW objectives, to generate a modified virtual world (MVW);
   a transformation engine configured to capture differences between the VW and the MVW, to transform the differences into inputs usable by the robotic actuator, and to transmit the inputs to the robotic actuator; and
   the robotic actuator including an autonomous instruction engine configured to receive the inputs to identify RWOs of interest and to combine the inputs with the first set of rules to generate a set of combined instructions usable by the robotic actuator to selectively execute individual ones of the robot-specific instructions to interact with the particular ones of the RWOs autonomously to achieve desired real-world (RW) objectives, wherein the VW objectives are independent of the RW objectives.

2. The system of claim 1, wherein the transformation engine is configured to capture differences between the VW and the MVW to identify VWOs selected by the user, and to transform the identified VWOs into inputs usable by the robotic actuator.

3. The system of claim 2, wherein the transformation engine is configured to transform the differences into robotic control instructions in the form of pick up item of a particular type at a particular location, x,y.

4. The system of claim 2, wherein the autonomous instruction engine is configured to receive the inputs in the form of the user identified VWOs to identify corresponding RWOs of interest.

5. The system of claim 4, wherein the autonomous instruction engine is configured to combine the inputs with the first set of rules to specify desired end-results of manipulation of the RWOs, to generate a set of combined instructions usable by the robotic actuator.

6. The system of claim 1, wherein the first set of rules comprise mathematical laws, physical laws, bio-chemical laws, and combinations thereof.

7. The system of claim 6, wherein the first set of rules comprise: desired locations/bins for particular RWOs; physical properties of the RWOs, including materials from which the RWOs are constructed; safety considerations associated with handling of the RWOs, including hazards; value of the RWO object, including rules governing the value of the object based on color, material type, quality, soil level; harm induced by the RWO if it were burned, buried, submerged, e.g. (Original), in pollute produced in ppm (parts per million); size of the RWOs, optimal pickup location for the RWOs; and mixtures and combinations thereof.

8. The system of claim 1, wherein the second set of rules comprise colorization of objects, sounds and music associated with objects or actions, animations or videos associated with objects or actions, and combinations thereof.

9. The system of claim 8, wherein the second set of rules comprise: colorization of objects based on value, material type, material grade, relative difficulty in grasping with the robot, rules about ppm of pollutants allowed to be un recovered; rules about the percent (%) of material by type to be recovered to meet different goals; rules about the value of materials recovered and the goal of the value of the recovered materials; sounds and music associated with the appearance of certain objects, such as with the collected objects or of desired objects that were "missed" by the user; sounds associated with certain actions which are being "rewarded" and sounds associated with actions being discouraged, such as an incomplete identification of an object, or failure to identify a predetermined number of objects per minute, as determined by the rules governing the goals; animations or videos associated with new actions for the user to learn, examples of items the user missed in previous sessions, new items of particular value or harm, or significant changes in the value or harm of a previously known item; instructions for how to solve a problem when presented with broken VWOs or too many items on the screen at one time; goals for the player, such as remove as much as you can, remove the most hazardous VWOs first; and combinations thereof.

10. The system of claim 1, wherein the robot-specific instructions include rules governing type and/or size of tool to use, the force with which the tool should grasp the particular RWO, the speed at which the tool should be moved in order to intercept the RWO, how much to close the tool to successfully pickup different sized RWOs, and combinations thereof.

11. The system of claim 1, wherein the autonomous instruction engine is communicably coupled to the robotic actuator.

12. The system of claim 1, wherein the robot is configured to interact with the RWOs autonomously by inserting the combined instructions into one or more of a plurality of preprogrammed instruction sets to synchronize the MVW with desired impacts on the RWOs.

13. The system of claim 1, wherein the set of robot-specific instructions are disposed in firmware.

14. The system of claim 1, wherein the sensor comprises an electromagnetic sensor.

15. The system of claim 14, wherein the electromagnetic sensor comprises an image capture device.

16. The system of claim 1, further comprising a data store including a third set of rules governing physical aspects of the VW, including light, visual and non-visual bands, sounds, temperature, weight, relative movement, and combinations thereof.

17. The system of claim 1, wherein the robotic actuator is configured to selectively execute the individual ones of the robot-specific instructions to interact with the particular ones of the RWOs autonomously and asynchronously relative to user interaction with the VW.

18. A method for performing tasks autonomously on real-world objects (RWOs) upon receipt of inputs from a virtual reality environment using the system of claim 1, the method comprising:
(a) detecting, with the one or more sensors, presence of the RWOs and generating data corresponding to said presence;
(b) capturing and using the data, with the VR computer, to generate the VW including VWOs representative of the RWOs;
(c) enabling a user, via the user interface, to manipulate the VWOs to generate a modified virtual world (MVW);
(d) capturing, with the transformation engine, differences between the VW and the MVW to transform the differences into inputs usable by the robotic actuator, and transmitting the inputs from the transformation engine to the robotic actuator;
(e) receiving inputs at the autonomous instruction engine of the robotic actuator to identify RWOs of interest and with the autonomous instruction engine, combining the inputs with the first set of rules to generate a set of combined instructions usable by the robotic actuator to selectively execute individual ones of the robot-specific instructions to interact with the particular ones of the RWOs autonomously; and
(f) manipulating the RWOs with the robotic actuator.

* * * * *